March 10, 1970     J. F. MALYS     3,499,698
METER READING TUBE
Filed July 19, 1966
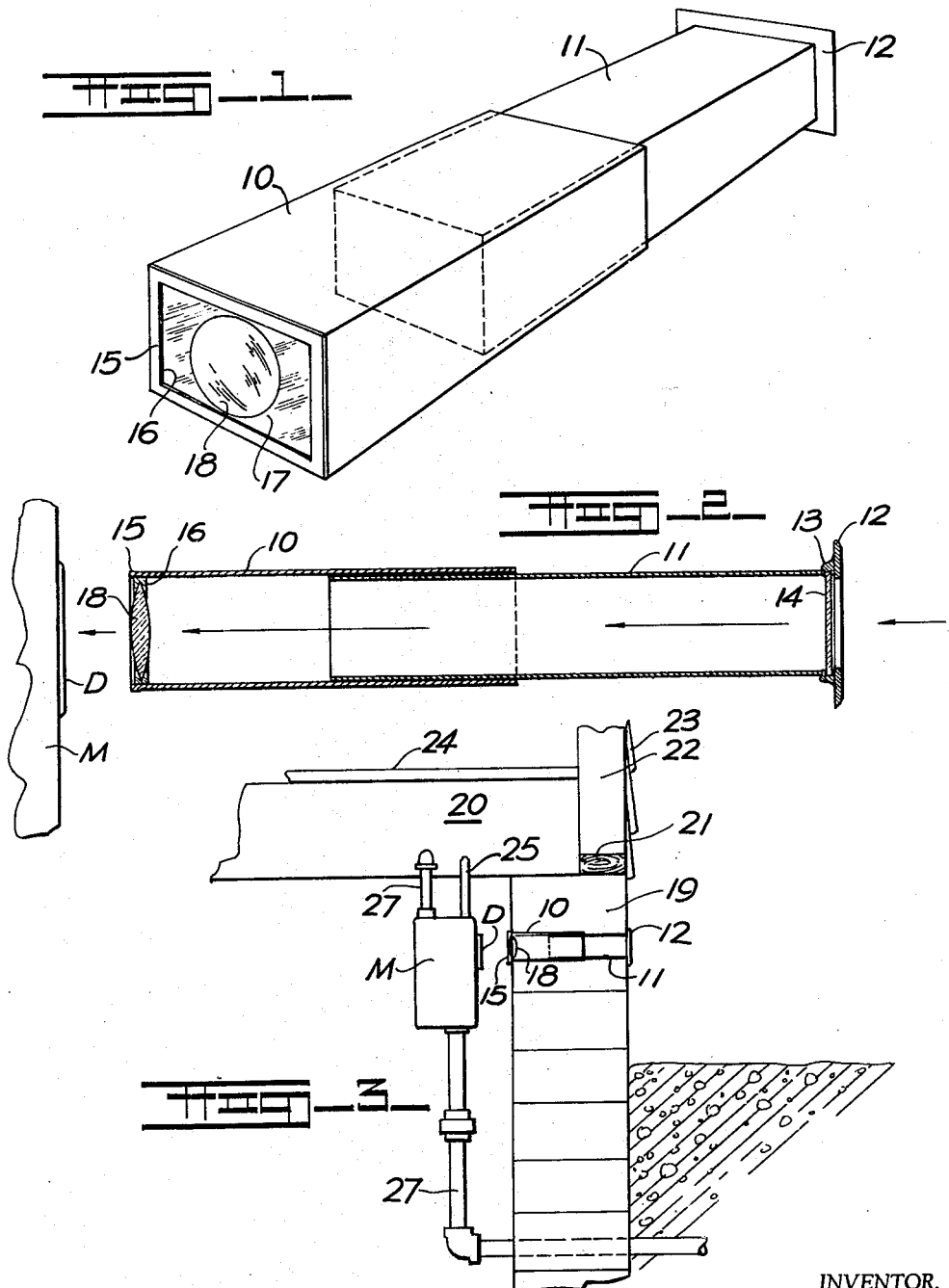
INVENTOR.
Joseph Malys.
BY
W. B. Hartsman
ATTORNEY

United States Patent Office 3,499,698
Patented Mar. 10, 1970

3,499,698
METER READING TUBE
Joseph F. Malys, 1935 Donald Ave.,
Youngstown, Ohio 44509
Filed July 19, 1966, Ser. No. 566,318
Int. Cl. G02b 27/02
U.S. Cl. 350—115
2 Claims

ABSTRACT OF THE DISCLOSURE

The device is a telescopic tube, having transparent windows or panels at each end, inserted through a wall and in alignment with the dial of a watermeter. The inner window or panel has a centrally located lens area. The panel carrying the lens is longitudinally adjustable with respect to the tube for focusing the lens on the dial. Light from the outside may be directed through the windows or panels to light up the dial for reading through the lens area.

---

This invention relates to a meter reading tube and more particularly to a tubular device that may be installed through a wall of a building such as a dwelling house so that a meter located in the house can be read from the exterior thereof.

The principal object of the invention is the provision of a meter reading tube for positioning in a wall of a building or other enclosure to permit reading a meter within the enclosure therethrough.

A further object of the invention is the provision of a meter reading tube for installation through a wall and including a lens in said tube movably positioned so that the same may be focused on a meter or the like.

A still further object of the invention is the provision of a meter reading tube for installation through a wall of an enclosure or building and adjustable as to the length to accommodate various widths of walls.

It has been the general practice of utility companies such as the gas, electric and water service companies as well as municipalities dealing in such services to position meters in the buildings or dwellings served so that the same may be read periodically and bills submitted for the same. Most such service meters have been located in the basements or cellars of the buildings or dwelling houses, necessitating the meter readers entering the building and locating the meter before he is able to read the same. In some areas some utilities have in recent years located the meters on the outside walls of the buildings or dwellings in an effort to simplify the meter reading job and save the time the meter reader otherwise spends in the dwelling or building. The location of meters exteriorly of buildings and dwellings has not been satisfactory because the same are subject to vandalism and accidental breakage and damage as they are completely exposed and not at all protected by the dwelling or building on which they are mounted.

The present invention solves both of the above problems by permitting the mounting of the meter within the building or dwelling where it is in a protected location and at the same time provides means whereby it may be read from the exterior of the dwelling or building thus making available all of the advantages of the exterior location with none of the disadvantages thereof.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the meter reading tube with parts in broken lines indicating a telescopic section thereof.

FIGURE 2 is a vertical section longitudinally of the device and including a representation of a portion of a meter and the dials thereon in appoprirate position.

FIGURE 3 is a schematic illustration of a portion of a dwelling including a basement or cellar wall and showing the meter positioned therein and the meter reading tube located in the wall in operable position.

By referring to the drawings in FIGURE 1 in particular, it will be seen that the meter reading tube comprises a pair of elongated tubular body members 10 and 11, the body member 11 being telescopically engaged within the body member 10. The body member 11 has an outturned flange 12 on its outermost end and the flange, as best seen in FIGURE 2 of the drawings, forms a portion of a window frame 13 mounting a piece of glass or transparent plastic 14.

By referring to FIGURES 1 and 2 of the drawings, it will be seen that the outermost end of the elongated tubular body member 10 has a secondary flange 15 defining the end thereof and a manually longitudinally movable frame 16 inwardly thereof mounting a transparent member 17 which includes a magnifying lens area 18.

In FIGURE 2 of the drawings, a portion of a meter M and the dial area D thereof is shown in operative position relative to the lens 18 in the meter reading tube.

By referring now to FIGURE 3 of the drawings, a symbolic illustration of a portion of a dwelling may be seen to include a cellar wall 19, floor joist 20 and a plate 21 positioned on the wall 19 supporting a frame construction including studding 22 and siding 23. A floor 24 is shown on the floor joists 20. The floor joist 20 is shown supporting the meter M by a supporting bracket 25 and the pipe supplying the meter is indicated by the numeral 26 while the pipe leading from the meter M is indicated by the numeral 27. It will be obvious that the meter M may be positioned in a water line, a gas line, or an oil line or the like and that while a fluid meter is shown, the invention works equally well with an electric meter.

As illustrated in FIGURE 3 of the drawings, the meter reading tube is installed through the cellar wall 19 and the meter M is positioned so that its dial area D is in spaced unobstructed relation to the inner end of the meter reading tube and more specifically adjacent to the lens 18.

By referring again to FIGURE 1 of the drawings, it will be seen that the lens 18 is formed centrally of a transparent panel 17 so that if necessary a flash light or other portable light source may be directed through the meter reading tube from the end defined by the outturned flange 12 thereof and thus be capable of illuminating the dial D on the meter M so that they can be readily seen through the meter reading tube. It will also be obvious that the lens 18 can be moved in the elongated tubular body member 10 so as to properly focus upon the dial D with respect to the location of the same relative to the meter reading tube and the length of the reading meter tube itself.

The focusing of the lens 18 is possible because the frame 16 which mounts the transparent end panel 17 which includes the lens 18 is movable longitudinally of the elongated tubular member 10. It will thus be seen that the meter reading tube disclosed herein may be simply and easily installed in a basement or a cellar wall or through any building wall and in proximity to a meter to be read and that it accommodates with respect to the thickness of the wall and the spacing of the meter dials with respect thereto. It will thus be seen that the meter reading tube disclosed herein meets the several objects of the invention and having thus described my invention, what I claim is:

1. The combination of a building having a utility meter positioned therein adjacent a wall thereof and a meter reading tube positioned through said wall in line of sight of said meter, said meter reading tube comprising an extensible box-like tubular member having a transparent window panel on each end and means thereabout forming a closure with the exterior of said wall and a lens area substantially centrally positioned in the inner transparent window panel and longitudinally movable relative to said tube whereby the lens may be focused on said meter so that the dials thereof may be read through the tube by light directed through the window panels from the outside.

2. The combination as defined in claim 1 wherein the window panels are elongated rectangular in shape and the diameter of the lens area is substantially the width of the rectangle.

References Cited

UNITED STATES PATENTS

| | | | |
|---|---|---|---|
| 1,277,859 | 9/1918 | Cieszkowski | 350—81 |
| 1,617,932 | 2/1927 | Work et al. | 350—113 |
| 2,181,453 | 11/1939 | Gelakoski | 350—113 |

DAVID SCHONBERG, Primary Examiner

P. R. MILLER, Assistant Examiner

U.S. Cl. X.R.

350—81, 114, 243